UNITED STATES PATENT OFFICE.

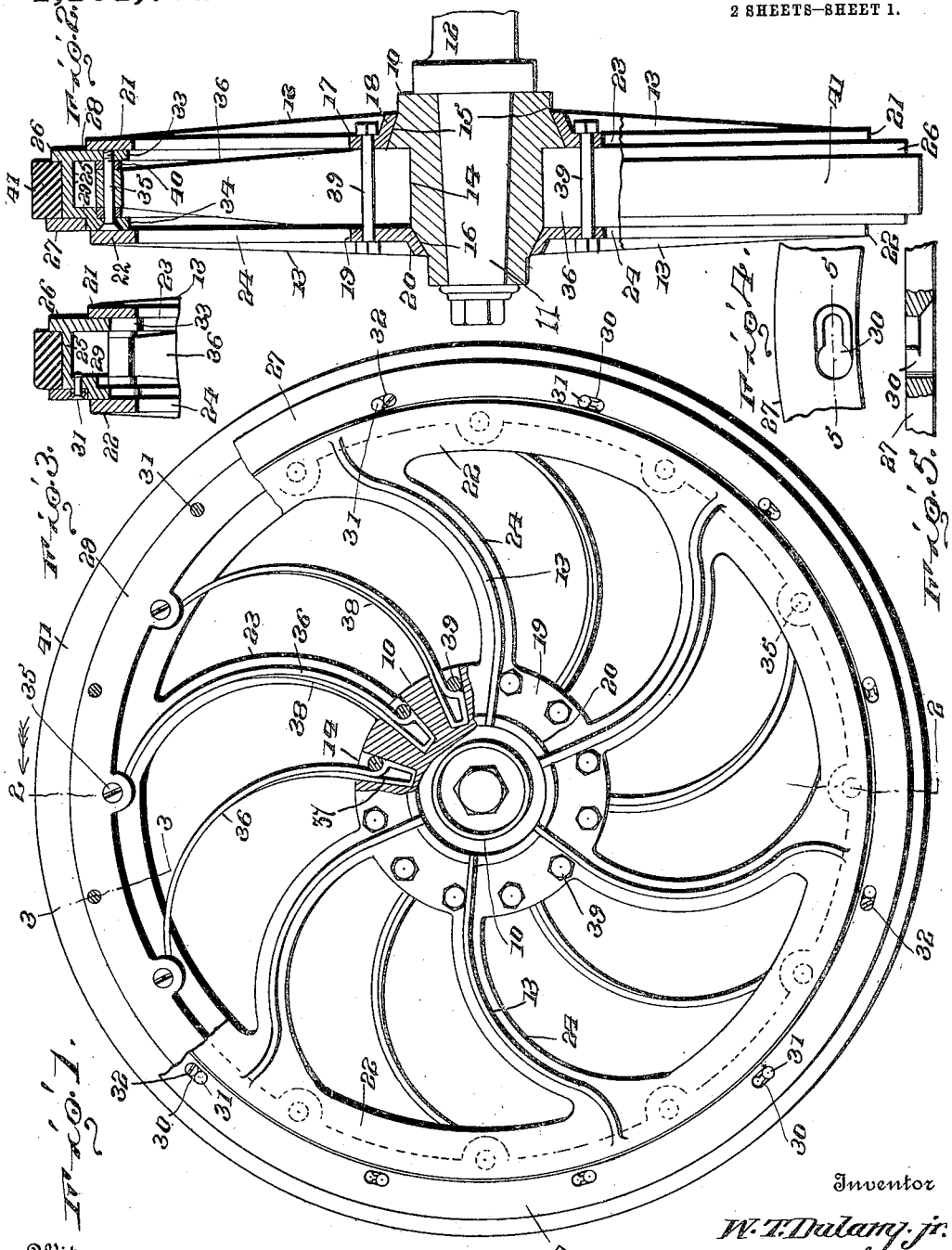

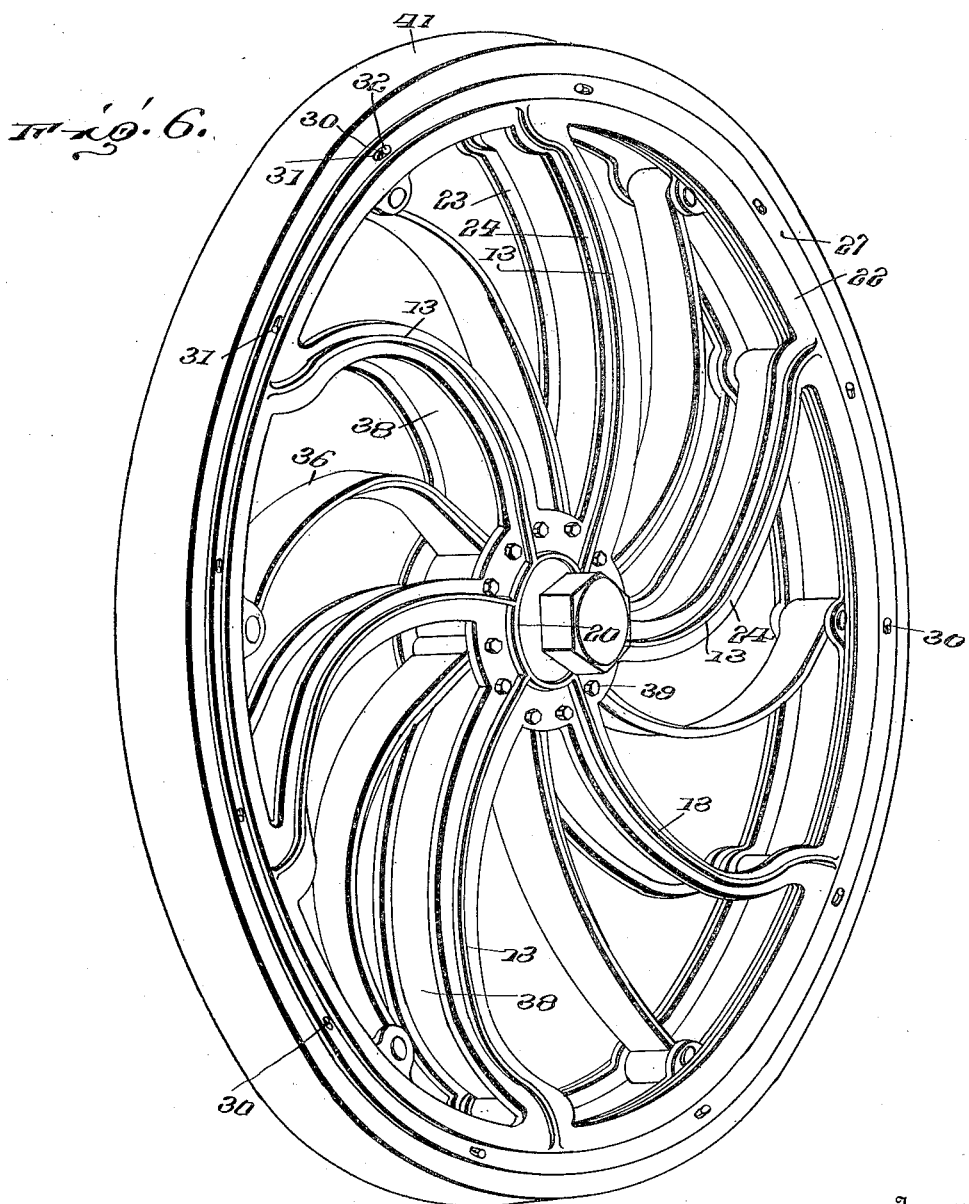

WILLIAM T. DULANY, JR., OF ARLINGTON, NEW JERSEY.

WHEEL.

1,101,791. Specification of Letters Patent. Patented June 30, 1914.

Application filed October 31, 1911. Serial No. 657,901.

*To all whom it may concern:*

Be it known that I, WILLIAM T. DULANY, Jr., citizen of the United States, residing at Arlington, in the county of Hudson and State of New Jersey, have invented certain new and useful Improvements in Wheels, of which the following is a specification.

This invention relates to improvements in wheels, more particularly of the class of spring wheels, and has for one of its objects to improve the construction and increase the efficiency and utility of devices of this character.

Another object of the invention is to provide a wheel of this character which embraces a yieldable rim and with means whereby the wheel is caused to operate in event of the breakage of one or more of the springs.

With these and other objects in view the invention consists in certain novel features of construction as hereinafter shown and described and then specifically pointed out in the claim, and in the drawings illustrative of the preferred embodiment of the invention: Figure 1 is a side elevation of the improved wheel partly in section; Fig. 2 is a section on the line 2—2 of Fig. 1 looking in the direction of the arrow; Fig. 3 is a sectional detail on the line 3—3 of Fig. 1, looking in the direction of the arrow; Fig. 4 is a portion of the detachable tire ring enlarged; Fig. 5 is a plan view of the same in section on the line 5—5 of Fig. 4; Fig. 6 is a perspective view of the improved wheel from the outer side.

Corresponding and like parts are referred to in the following description and indicated in all the views of the accompanying drawing by the same reference characters.

The improved wheel is designed more particularly for use upon automobiles and like vehicles and to take the place of the ordinary pneumatic tire.

The improved wheel comprises a hub 10 mounted for rotation upon the journal 11 of an axle 12 in the usual manner. The hub is formed with a plurality of outwardly opening radial pockets 14 closed at the end next to the axle and with the outer face of the hub rearwardly of the pockets conical or converging as shown at 15. The hub 10 is formed near its forward end with another conical or converging portion 16, the latter converging portion being smaller than the converging portion 15. Bearing upon the larger converging portion 15 of the hub is an annular member 17 having a flange 18 closely engaging the converging face 15, while a similar annular member 19 bears upon the converging portion 16 of the hub and is provided with a converging or conical flange 20 as shown. Spaced from the annular member 17 is a rigid rim member 21, while a similar rigid rim member 22 is spaced from the annular member 19. The rim member 21 is concentric to the annular member 17 and connected therewith by a plurality of spokes 23, while the rim member 22 is concentric to the annular member 19 and connected thereto by a plurality of spokes 24 also preferably curved and in alinement transversely of the wheel with the spokes 23, the spokes having strengthening ribs 13, as shown.

Located just beyond the annular members 21—22, is a rim 25 having an outwardly directed integral flange 26 at one end and a detachable annular ring 27 at the other end. The rim 25 is also provided at its ends with inwardly directed integral flanges 28—29. The ring member 27 is provided with a plurality of slots 30 large enough at one end to permit the ring to be passed over the enlarged heads of holding pins 31 which are tapped or otherwise rigidly secured in the rim 25, and reduced at the other end as shown in Figs. 4 and 5, to receive the head when the ring is rotated for a short distance in one direction. By this arrangement the ring may be readily detached when moved far enough in one direction to bring the enlarged heads opposite the enlarged ends of the slots, and locked to the rim 25 and its flange 29 when the ring is moved far enough in the opposite direction to engage the heads in the reduced ends of the slots. By this simple means the ring 27 may be quickly attached and detached. To prevent the displacement of the ring 27 a locking bolt 32 is passed through the enlarged end of one or more of the slots 30 and tapped into the rim 25 alongside of the pin 31, to lock the ring from retrograde movement when the wheel is in use. Any number of the locking screws may be employed, but generally three will be used as a measure of safety. By this means a channeled rim is produced which supports the tire 41, the latter being preferably of rubber of suitable texture.

The ring 27 is disposed wholly beyond the rigid rim member 22, so that when the ring is detached as above described, the tire 41 may be applied or removed without dismembering the other parts of the wheel. Directed inwardly from the flange 28 are a plurality of ears 33, while a plurality of similar ears 34 extend inwardly from the flange 29, each opposite pair of the ears being connected by a bolt 35. The holding pins 31 and the lock bolts 32 are not covered by the rigid rim 22, so that the member 27 may be detached to release the tire 41 without dismembering the wheel. The spoke bolts or rivets 35 are covered by the rim members 21—22 and are thus retained in place and prevented from working loose or dropping out when the wheel is in use. The hub sockets 14 are designed to receive the inner ends of the spring spokes 36, preferably of the same form as shown in the patent granted to me June 11, 1912, No. 1,029,177, and are each formed to fit around one of the bolts or pins 35, and bent upon itself intermediate the ends, and enlarged at the bend to conform respectively to the sockets 14 as shown at 37 in Fig. 1, to completely fill the same. The remaining portion of the leaf 38 is extended to bear upon the adjacent face of the main portion of the leaf and is preferably gradually reduced in thickness as represented. The enlargement 37 forms a lateral shoulder and the members 17—19 are connected by pins or bolts 39 which bear upon these shoulders and thus retain the spokes in engagement with the sockets of the hub.

It will be noted that the ears 33—34 and the sockets 14 are so located relative to the spokes 23—24 that the spring spokes 36—38 conform substantially to and are covered by the spokes 23—24 as shown. It will also be noted that only one half as many of the spokes 23—24 are employed in the improved wheel as there are spring spokes, consequently every alternate spring spoke will be located between a pair of the spokes 23—24, or in other words, about one half of the spring spokes are covered and concealed by the outer or rigid spokes 23—24. The outer rolled ends of the spokes are supported between bearing washers 40. By this simple arrangement it will be obvious that when the wheel is in operation the tire 41 together with the rim 25 and its attachments will yield under pressure and compress the spring spokes 36—38, while the rigid rim members 21—22 together with the rigid spokes 23—24 will retain their position constantly relative to the hub, the members 26—27 sliding between the members 21—22 when the spring-supported wheel yields under pressure. By this means the yieldable rim is supported from both sides and in event of the breakage of one or more of the spring spokes the wheel will continue to operate as the pressure is then transferred to the members 21—22. This prevents any danger of collapse of the wheel in event of the breakage of one or more of the spring spokes, and enables the vehicle to be readily transported to a garage or repair shop. This arrangement materially increases the utility and efficiency of the wheel and likewise increases its safety.

All of the parts of the wheel except the tire 41 are of metal, and preferably of steel.

The improved wheel may be readily adapted for vehicles of various sizes and is equally applicable to the lightest or heaviest vehicles.

It will be noted that the improved wheel comprises an efficient "quick detachable" tire, as it is only necessary to detach the locking pin or pins 32 and rotate the tire flange 27 slightly backward when it can be removed laterally and permit the ready release of the tire 41, and the quick installation of a new tire and without disturbing the other parts of the wheel or even detaching the wheel from the axle.

Having thus described the invention, what is claimed as new is:

In a wheel, a hub having a plurality of outwardly and laterally opening pockets, annular members bearing against the hub and closing the lateral openings of the pockets, the rim faces of the annular members being flush with the rim face of the hub, a plurality of yieldable spokes enlarged at their inner ends to form stop shoulders and engaged by the enlarged portions in the pockets, and clamp bolts extending through the annular members and likewise through the pockets and engaging the stop shoulders and bearing against the adjacent walls of the pockets.

In testimony whereof I affix my signature in presence of two witnesses.

WILLIAM T. DULANY, Jr. [L. S.]

Witnesses:
  J. CARLISLE LONDON,
  FREDERICK R. WEBER.

---

Copies of this patent may be obtained for five cents each, by addressing the "Commissioner of Patents, Washington, D. C."